(12) United States Patent
Chandrasekaran (10) Patent No.: US 9,141,392 B2
(45) Date of Patent: Sep. 22, 2015

(54) DIFFERENT CLOCK FREQUENCIES AND STALLS FOR UNBALANCED PIPELINE EXECUTION LOGICS

(75) Inventor: Senthilkannan Chandrasekaran, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 744 days.

(21) Appl. No.: 13/089,101

(22) Filed: Apr. 18, 2011

(65) Prior Publication Data

US 2011/0258417 A1    Oct. 20, 2011

(30) Foreign Application Priority Data

Apr. 20, 2010    (IN) .......................... 1129/CHE/2010

(51) Int. Cl.
*G06F 9/30* (2006.01)
*G06F 9/38* (2006.01)
*G06F 11/34* (2006.01)

(52) U.S. Cl.
CPC .......... *G06F 9/3869* (2013.01); *G06F 11/3466* (2013.01); *G06F 11/3409* (2013.01); *G06F 2201/88* (2013.01); *G06F 2201/885* (2013.01); *Y02B 60/165* (2013.01)

(58) Field of Classification Search
CPC .......................... G06F 9/3869; G06F 11/3466
USPC ........................................................ 712/220
See application file for complete search history.

(56) References Cited

U.S. PATENT DOCUMENTS

| 2003/0135779 | A1* | 7/2003 | Takashima et al. ........... 713/600 |
| 2005/0132238 | A1* | 6/2005 | Nanja ............................ 713/300 |
| 2006/0059377 | A1* | 3/2006 | Sherburne ..................... 713/300 |
| 2006/0064679 | A1* | 3/2006 | Ozaki ........................... 717/127 |
| 2006/0200651 | A1* | 9/2006 | Collopy et al. ................ 712/220 |
| 2007/0074216 | A1* | 3/2007 | Adachi et al. ................. 718/102 |
| 2009/0019265 | A1* | 1/2009 | Correale et al. .............. 712/216 |
| 2009/0217277 | A1* | 8/2009 | Johnson et al. ............... 718/102 |
| 2011/0047401 | A1* | 2/2011 | Werner ......................... 713/500 |
| 2011/0131442 | A1* | 6/2011 | Watanabe et al. ............. 713/501 |

OTHER PUBLICATIONS

Placek, C. A. (2009). Voltage over-scaling in unbalanced pipelines with adaptive clocking. (Order No. 1469905, Purdue University). ProQuest Dissertations and Theses, 42. Retrieved from http://search.proquest.com/docview/304990253?accountid=14753. (304990253).*

* cited by examiner

*Primary Examiner* — Boris Gorney
*Assistant Examiner* — Keith Nielsen
(74) *Attorney, Agent, or Firm* — Lawrence J. Bassuk; Charles A. Brill; Frank D. Cimino (57) ABSTRACT

A method includes determining a rate of resource occupancy of a constituent stage of an unbalanced instruction pipeline implemented in a processor through profiling an instruction code. The method also includes performing data processing at a maximum throughput at an optimum clock frequency based on the rate of resource occupancy.

7 Claims, 5 Drawing Sheets

DIFFERENT CLOCK FREQUENCIES AND STALLS FOR UNBALANCED PIPELINE EXECUTION LOGICS

FIELD OF TECHNOLOGY

This application claims priority from Indian Provisional Application Serial No. 1129/CHE/2010 filed on Apr. 20, 2010, entitled "POWER AND THROUGHPUT OPTIMIZATION OF AN UNBALANCED INSTRUCTION PIPELINE", which is incorporated herein by reference in its entirety. Embodiments of the disclosure relate to instruction pipelining in processors.

BACKGROUND

Instruction pipelining is a technique used in processors (e.g., microprocessors, microcontrollers) to allow for parallel processing of instructions. For example, one instruction is associated with a first stage of an instruction pipeline and another instruction is associated with a second stage of the instruction pipeline. The instruction pipeline allows for "breaking" of the timing associated with a large data path, and provides parallelism in executing the instructions at an increased clock frequency.

The instruction pipeline offers optimum performance only when the constituent stages are perfectly balanced. A balanced pipeline implies that processing associated with a constituent stage of the pipeline takes a completion time equal to the completion time associated with all other constituent stage(s) of the instruction pipeline. However, there are scenarios (e.g., hard macro(s) such as memory/memories being in the data path of the pipeline, Arithmetic Logic Units (ALU units) such as multipliers, adders, bit shifters and dividers being in a same constituent stage of the pipeline) where a programmer/user is not able to perfectly balance the instruction pipeline. Here, the maximum frequency at which the unbalanced pipeline is clocked is determined through the constituent stage therein offering the maximum delay.

Assuming no stalls in an unbalanced instruction pipeline, the maximum frequency, $f_{max}$, at which the unbalanced instruction pipeline is clocked is expressed in example Equation (1) as:

$$f_{max} = \frac{1}{d}, \quad (1)$$

where d is the maximum delay offered by a constituent stage.

Assuming the time taken for executing N instructions to be (N+$n_s$) cycles ($n_s$ being the number of constituent stages of the unbalanced instruction pipeline), the effective throughput, E, is be expressed in example Equation (2) as:

$$E = f_{max} \cdot \frac{N}{(N + n_s)} \sim f_{max} \quad (2)$$

The throughput, E as seen in Equation (2), is the number of instructions per second. Increased throughput is associated with a higher $f_{max}$, which implies a lower maximum delay offered by the constituent stage of the unbalanced instruction pipeline.

The pipeline can be clocked at a frequency higher than that computed based on the max-delay, and when the usage of timing-path involving the max-delay is detected, then the pipeline can be stalled for a number of cycles equivalent to the delay offered by the timing-path. This is known as pipeline stalling.

With the above approach, the frequency might not be optimal, if the usage of the timing-path involving max-delay is not frequent. It would lead to unnecessary dynamic power dissipation. Hence, there is a need to arrive at an optimum frequency for a given rate of usage of the timing-path involving the maximum delay.

SUMMARY

In one aspect, a method includes determining a rate of resource occupancy of a constituent stage of an unbalanced instruction pipeline implemented in a processor through profiling an instruction code. The method also includes performing data processing associated with the unbalanced instruction pipeline at a maximum throughput at an optimum clock frequency based on the rate of resource occupancy In another aspect, a method determining a time interval within a processing time associated with a constituent stage of an unbalanced instruction pipeline implemented in a processor based on a change in a processing scenario associated with data processing therein. The method also includes dynamically determining a rate of resource occupancy of the constituent stage periodically with a time period equal to the determined time interval through profiling an instruction code associated therewith. Further, the method includes periodically obtaining a clock frequency associated with the rate of resource occupancy of the constituent stage and performing the data processing at the periodically obtained clock frequency. The clock frequency corresponds to an optimized power consumption and/or a throughput associated with the unbalanced instruction pipeline.

In yet another aspect, a computing system includes a processor having an unbalanced instruction pipeline implemented therein and a memory configured to store an instruction code associated with processing through the unbalanced instruction pipeline. The computing system also includes a determination module configured to determine a rate of resource occupancy of a constituent stage of the unbalanced instruction pipeline through profiling the instruction code associated with processing through the unbalanced instruction pipeline. The processor is configured to perform data processing at a maximum throughput at an optimum clock frequency based on the rate of resource occupancy.

Other features will be apparent from the accompanying drawings and from the detailed description that follows.

Other features of the present embodiments will be apparent from the accompanying drawings and from the detailed description that follows.

DETAILED DESCRIPTION

Disclosed are a method, an apparatus and/or a system to optimize power and throughput in an unbalanced instruction pipeline implemented in a processor associated therewith. Although the present embodiments have been described with reference to specific example embodiments, it will be evident that various modifications and changes is made to these embodiments without departing from the broader spirit and scope of the various embodiments.

Figure 1:
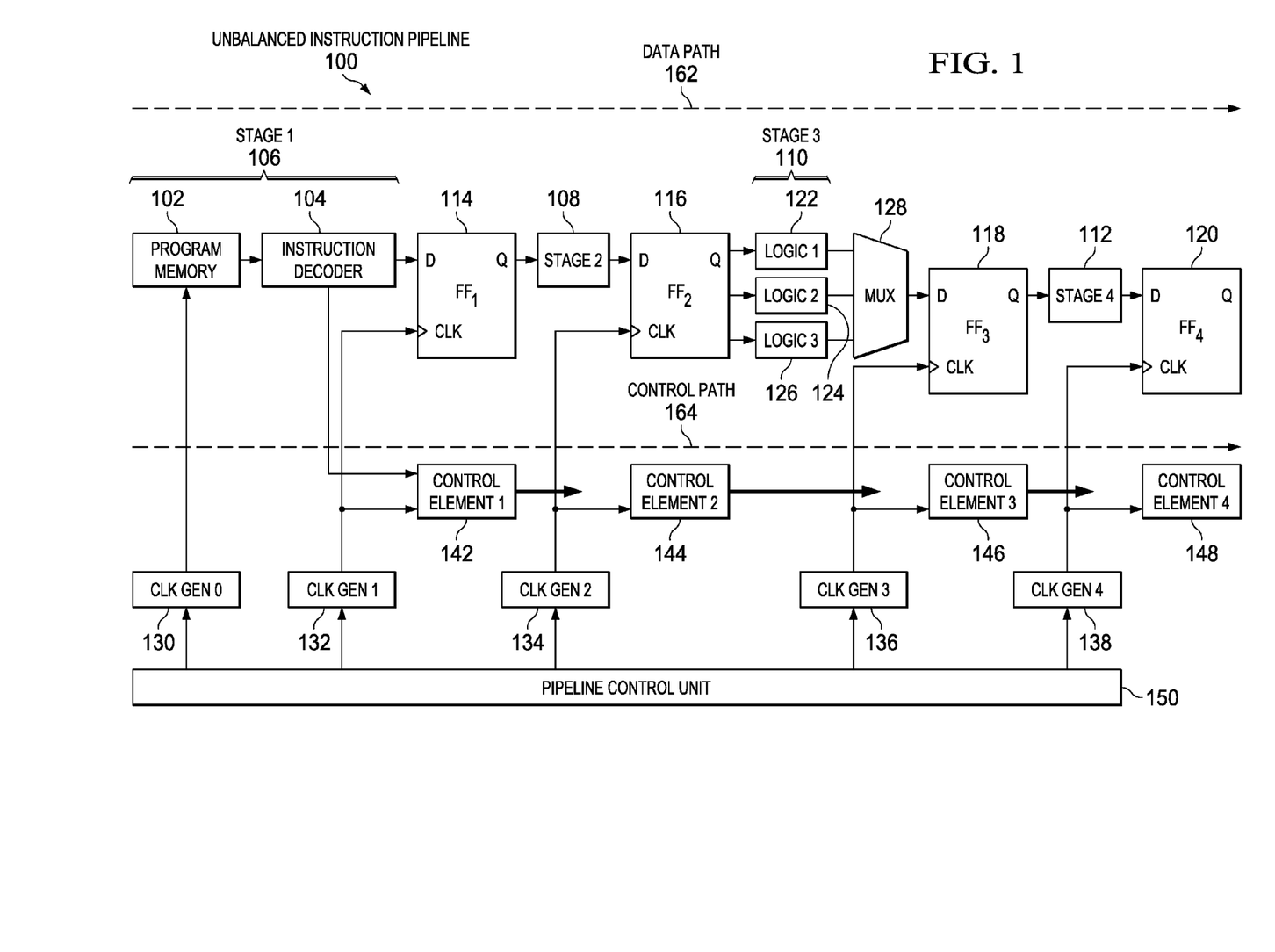
FIG. 1 is a schematic view of a data path and a control path associated with an unbalanced instruction pipeline, according to one or more embodiments.

FIG. 1 illustrates a data path 162 and a control path 164 associated with an unbalanced instruction pipeline 100, according, to one or more embodiments. An instruction code associated with processing through unbalanced instruction pipeline 100 is stored in program memory 102. Program memory 102 is a Read-Only Memory (ROM). In some cases, a data memory (not shown) in the form of a Random Access Memory (RAM) is used to store intermediate results and variables associated with the processing. Program memory 102 may also be configured to store constants associated with the processing. Instructions stored in program memory 102 is decoded through instruction decoder 104 and matching control signals for the pipelined data path 162 is generated.

The aforementioned operations (e.g., instruction decoding) constitute stage 1 106 of unbalanced instruction pipeline 100. In the example embodiment shown in FIG. 1, unbalanced instruction pipeline 100 is shown to include stages (e.g., stage 1 106, stage 2 108, stage 3 110, stage 4 112). The unbalanced instruction pipeline 100 includes more than four stages or even less than four stages, and that the four stages shown in FIG. 1 merely serve as an example. In another example embodiment, stage 1 106 is associated with an instruction fetch operation, stage 2 108 is associated with an instruction decode operation, stage 3 110 is associated with an execute operation, stage 4 112 is associated with a memory access operation, and stage 5 (not shown) is associated with a write back operation.

Registers are inserted between stages of unbalanced instruction pipeline 100. Specifically, in one or more embodiments, output of each stage is an input to a flip-flop (e.g., $FF_1$ 114, $FF_2$ 116, $FF_3$ 118, $FF_4$ 120). For example, as shown in FIG. 1, D flip-flops are for the aforementioned purpose. Each D flip-flop is configured to receive the output of the previous stage (e.g., instruction decoder 104 output, output of D flip-flop (Q)) as the D input thereof. Each flip-flop (e.g., $FF_1$ 114, $FF_2$ 116, $FF_3$ 118, $FF_4$ 120) is clocked through a clock generation circuit (e.g., CLK GEN 1 132, CLK GEN 2 134, CLK GEN 3 136, CLK GEN 4 138). Program memory 102 also has a clock generation circuit (e.g., CLK GEN 0 130) associated therewith. In an example embodiment, the clock generation circuit includes a crystal oscillator. The clock generation circuits (e.g., CLK GEN 0 130, CLK GEN 1 132, CLK GEN 2 134, CLK GEN 3 136, CLK GEN 4 138) associated with the individual stages are controlled through pipeline control unit 150.

Unbalanced instruction pipeline 100 may include a data path 162 and a control path 164. As shown in FIG. 1, data path 162 may include flip-flops configured to latch onto and propagate data to succeeding stages. Control path 164 may include control elements (e.g., control element 1 142, control element 2 144, control element 3 146, control element 4 148) configured to control data processing through the stages of unbalanced instruction pipeline 100. For example, control elements is configured to assert a signal to enable data transfer through data path 162 at an output. Flip-flops are used as control elements in unbalanced instruction pipeline 100. In one or more embodiments, pipeline control unit 150 is also configured to control clock gating (to be discussed below) and data forwarding through each stage of unbalanced instruction pipeline 100 using the decoded instruction control signals available through control elements. Further, pipeline control unit 150 is configured to utilize the decoded instruction control signals from each stage of unbalanced instruction pipeline 100 to detect data hazards therein.

In the example embodiment of FIG. 1, stage 3 110 includes logic associated therewith. Specifically, FIG. 1 illustrates stage 3 110 as including logic 1 122, logic 2 124, and logic 3 126. Also, a multiplexer (MUX 128) may select one of logic 1 122, logic 2 124 and logic 3 126 based on a control signal. It is noted that there is more logic units associated with stage 3 110. Logic 1 122, logic 2 124 and/or logic 3 126 is Arithmetic Logic Units (ALU units) (e.g., multiplier, adder, bit shifter, divider). For the sake of convenience in understanding, it is assumed that logic 1 122 is a divider, logic 2 124 is an adder, and logic 3 126 is a multiplier, and that a task completion time associated with logic 1 122 is 15 nanoseconds (15 ns), a task completion time associated with logic 2 124 is 2 ns, and a task completion time associated with logic 3 126 is 5 ns. The task completion times associated with all other stages (e.g., stage 1 106, stage 2 108, stage 4 112) is assumed to be 2 ns.

Thus, the maximum delay associated with unbalanced instruction pipeline 100/stage 3 110 will be 15 ns. Further, it is assumed that the probability of logic 1 122 being utilized during processing is lower than the probability associated with the use of logic 2 124 and logic 3 126. In other words, MUX 128 is configured to select logic 2 124 or logic 126 more frequently than logic 1 122. If unbalanced instruction pipeline 100 is clocked at a frequency associated with the maximum delay in stage 3 110 (e.g., 15 ns due to logic 1 122), the throughput (see, e.g., Equation (2)) associated with unbalanced instruction pipeline 100 is limited as the clock frequency is limited (e.g., to a maximum of 66.7 MHz) and the probability of use of logic 1 122 is low.

Thus, it is beneficial to clock unbalanced instruction pipeline 100 at a frequency higher than the example 66.7 MHz discussed above. For example, unbalanced instruction pipeline 100 is clocked at a frequency associated with the smallest delay associated with any of the constituent stages (e.g., stage 1 106, stage 2 108, stage 3 110, stage 4 112). In the example scenario discussed above, the smallest delay associated with the stages is 2 ns. Therefore, unbalanced instruction pipeline 100 is clocked at a frequency associated with 2 ns (i.e., 500 MHz).

Whenever the use of logic 1 122 is required, the execution (or, task completion) associated with stage 3 110 and the previous stages thereof (e.g., stage 2 108, stage 1 106) is stalled for at least a number of clocks corresponding to the delay associated with logic 1122 (e.g., 15 ns). The minimum number of 2 ns clocks required to cover 15 ns is 8. Thus, execution associated with logic 1 122, logic 2 124, and logic 3 126 of stage 3 110 are stalled for eight clock cycles, one clock cycle and three clock cycles respectively. Stalling is accomplished through gating the clock inputs to the flip-flops associated with stage 3 110 (e.g., $FF_3$ 118) and the previous stages thereof (e.g., stage 2 108 and $FF_2$ 116, stage 1 106 and $FF_1$ 114). In one or more embodiments, new instructions are prevented from entering unbalanced instruction pipeline 100 during the stall.

Clock gating for the purpose of stalling is controlled by pipeline control unit 150 (to be described below). Clock gating is controlled through control elements (e.g., control element 3 146, control element 2 144, control element 1 142), in association with pipeline control unit 150. At the simplest level, an AND gate (not shown) is employed for the clock gating. Here, the signal(s) associated with the stages (e.g., stage 3 110, stage 2 108, stage 1 106) that are stalled is inverted and input to the AND gate. The clock signals generated from the clock generation circuits (e.g., CLK GEN 3 136, CLK GEN 2 134, CLK GEN 1 132, CLK GEN 0 130) may also be input to the AND gate. Whenever the signal(s) is high, the inverted input to the AND gate is low and the clock output of the AND gate is also low, regardless of the state of the clock inputs. Clock gating circuits are known to one skilled in the art, and, therefore, discussion of more examples thereof is skipped for the sake of convenience.

In one embodiment, constituent stages of unbalanced instruction pipeline 100 include multi-cycle paths. Stage 3 110, for example, may include a multi-cycle path through logic 1 122. The multi-cycle path may require more than one clock cycle for completion of the task associated therewith. The task initiation is accomplished through a source flip-flop changing a state thereof, following which the result of the execution is transmitted to a destination flip-flop. The timing checks associated with the aforementioned stall process is part of, for example, a Static Timing Analysis (STA) utilized. Also, the multi-cycle path discussed above is defined during the STA by the programmer/user of a computing system executing tasks associated with unbalanced instruction pipeline 100.

If the probability of use of logic 1 122 for processing is high, the number of stalls increases for every instruction associated with the aforementioned processing. Thus, dynamic power consumption is impacted as the number of clock cycles is proportional to the dynamic power. In addition, unbalanced instruction pipeline 100 has clock buffers, the constituent flip-flop(s) of which toggles at rising/falling edges of clock pulses. This may contribute to increased dynamic power consumption. Therefore, in the abovementioned example, it is preferable to clock unbalanced instruction pipeline 100 at a frequency lower than 500 MHz.

It is possible to determine the rate of resource occupancy associated with an instruction/a constituent stage of unbalanced instruction pipeline 100 through profiling an instruction code associated therewith. In the example described above, an instruction is associated with division, multiplication and addition. For example, logic 1 122 is associated with division operations, logic 2 124 is associated with multiplication operations, and logic 3 126 is associated with addition operations. The rate of use (i.e., resource occupancy) of logic 1 122, logic 2 124 and logic 3 126 is expressed in example Equation (3) as:

$$R_{1,2,3} = \frac{N_{division, multiplication, addition}}{N} \quad (3)$$

where $R_1$, $R_2$, and $R_3$ are the rates of use of logic 1 122, logic 2 124 and logic 3 126 respectively, N is the number of instructions, and $N_{division}$, $N_{multiplication}$ and $N_{addition}$ are the number of division, multiplication and addition instructions respectively.

As discussed above, $R_1$, $R_2$ and $R_3$ is obtained through profiling the instruction code associated with processing through stage 3 110 of unbalanced instruction pipeline 100. For example, compiling/executing the instruction code associated therewith yields $R_1$, $R_2$ and $R_3$. Also, the rate of resource occupancy may depend on a system level scenario in which the instruction code is executed. Thus, obtaining the rate of resource occupancy associated with a stage (or, a sub-stage) of unbalanced instruction pipeline 100 may include monitoring utilization of a processor/memory associated therewith. Parameters associated with the aforementioned monitoring also includes instruction cache (e.g., instruction cache associated with program memory 102) hits/misses and data cache (e.g., data cache associated with data memory) hits/misses.

The instruction cache and the data cache may, respectively, allow for increased speed of an instruction fetch process and a data fetch/store process. In order to monitor these parameters, performance counters (or, registers) are employed in the processing/operating environment associated with processing through unbalanced instruction pipeline 100. The performance counters (or, registers) are configured to keep track of the abovementioned processor/memory utilization and/or a number of instruction/data cache hits/misses. The number of stall cycles associated with a clock frequency (e.g., 500/66.7 MHz) is estimated through the delay (e.g., 2 ns/15 ns) associated with the stage of unbalanced instruction pipeline 100, as discussed above.

In certain scenarios, rate vectors <R> is constant throughout run-time. For example, the instruction code being executed is associated with a reliability test of a product, which may take values of the same parameters that are approximately close to one another on different days and check for continued reliability. In such scenarios, an initial profiling of the instruction code may suffice to determine the rate vectors <R>. The clock frequency and the number of stall cycles is kept constant for the instruction code. In other scenarios, the rate vectors <R> may not be constant throughout run-time, and is changed dynamically, as will be discussed below.

Figure 2:
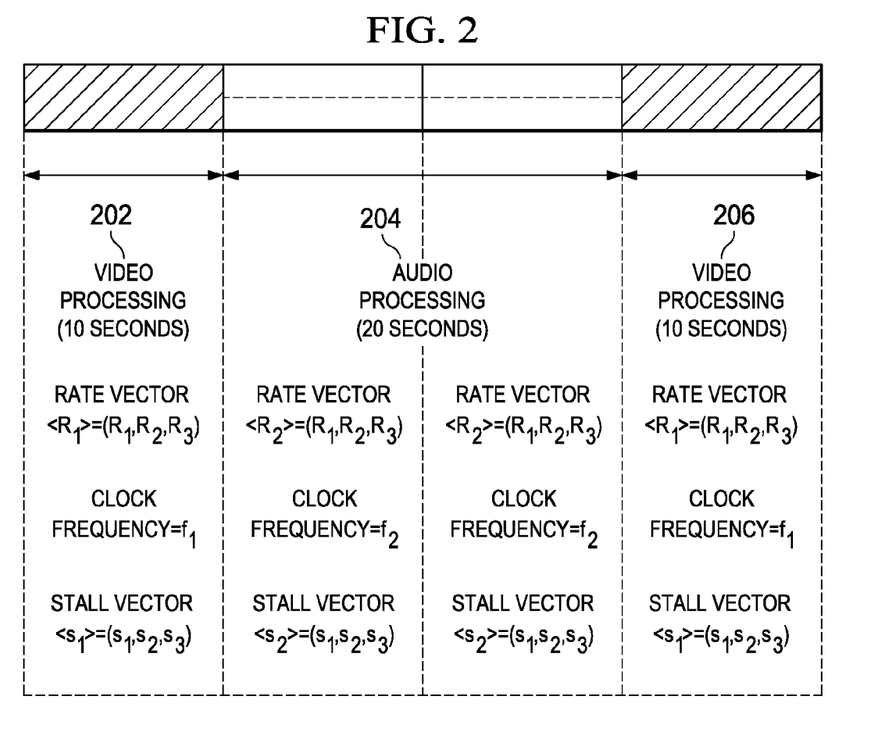
FIG. 2 is an illustrative view of an example processing scenario associated with the unbalanced instruction pipeline of FIG. 1.

FIG. 2 illustrates an example processing scenario, according to one or more embodiments. It is assumed that there is a processor in which unbalanced instruction pipeline 100 is implemented. The processor is configured to support video processing 202 for the first 10 seconds (s) of an operation. Audio processing 204 for the next 20 seconds and, again, video processing 206 for the next 10 seconds. Video processing 206 is analogous to video processing 202. As discussed above, $R_1$ is associated with the rate of use of logic 1 122, $R_2$ is associated with the rate of use of logic 2 124, and $R_3$ is associated with the rate of use of logic 3 126. As video processing (202, 206) involves operations (e.g., mathematical operations) that are different from that of audio processing 204, and the rate vector <$R_1$> (e.g., ($R_1,R_2,R_3$)) associated with video processing (202, 206) is different from the rate vector <$R_2$> (e.g., ($R_1,R_2,R_3$)) associated with audio processing 204, as shown in FIG. 2.

In the example shown in FIG. 2, the minimum occupancy time associated with audio/video processing (202, 204, 206) is 10 seconds. The minimum occupancy time is then sampled at, for example, every 1 s, which is the interval for estimating <R>. The pre-defined intervals for determining <R> are thus chosen based on the rate at which change in processing scenarios (e.g., audio processing 204, video processing (202, 206)) for the processor.

Thus, <R> (e.g., <$R_1$>, <$R_2$>) is estimated at pre-defined intervals, depending on which clock frequency and stall cycles is updated to the hardware associated with the processing. As shown in FIG. 2, video processing 202 involves a rate vector <$R_1$>, for which clock frequency $f_1$ and the associated stall vector <$s_1$> (e.g., ($s_1,s_2,s_3$)) is obtained based on maximizing throughput. Here, $s_1$ denotes the number of stall cycles associated with logic 1 122, $s_2$ denotes the number of stall cycles associated with logic 2 124, and $s_3$ denotes the number of stall cycles associated with logic 3 126.

At the end of the first 10 seconds, the clock frequency and the stall vector is updated in the hardware to $f_2$ and <$s_2$> (e.g., ($s_1,s_2,s_3$)) respectively to allow for an optimum (e.g., maximum) throughput during audio processing 204. The clock frequency and the stall vector continues to be $f_2$ and <$s_2$> for the next 20 seconds, although the associated rate vector <$R_2$> is still monitored for changes in the rates therein. At the end of the 20 seconds, the clock frequency and the stall vector is switched to $f_1$ and <$s_1$>, as audio processing 204 switches to video processing 206. The aforementioned operations, including the calculation of <R>, are performed through pipeline control unit 150 having associated logic.

Figure 3:
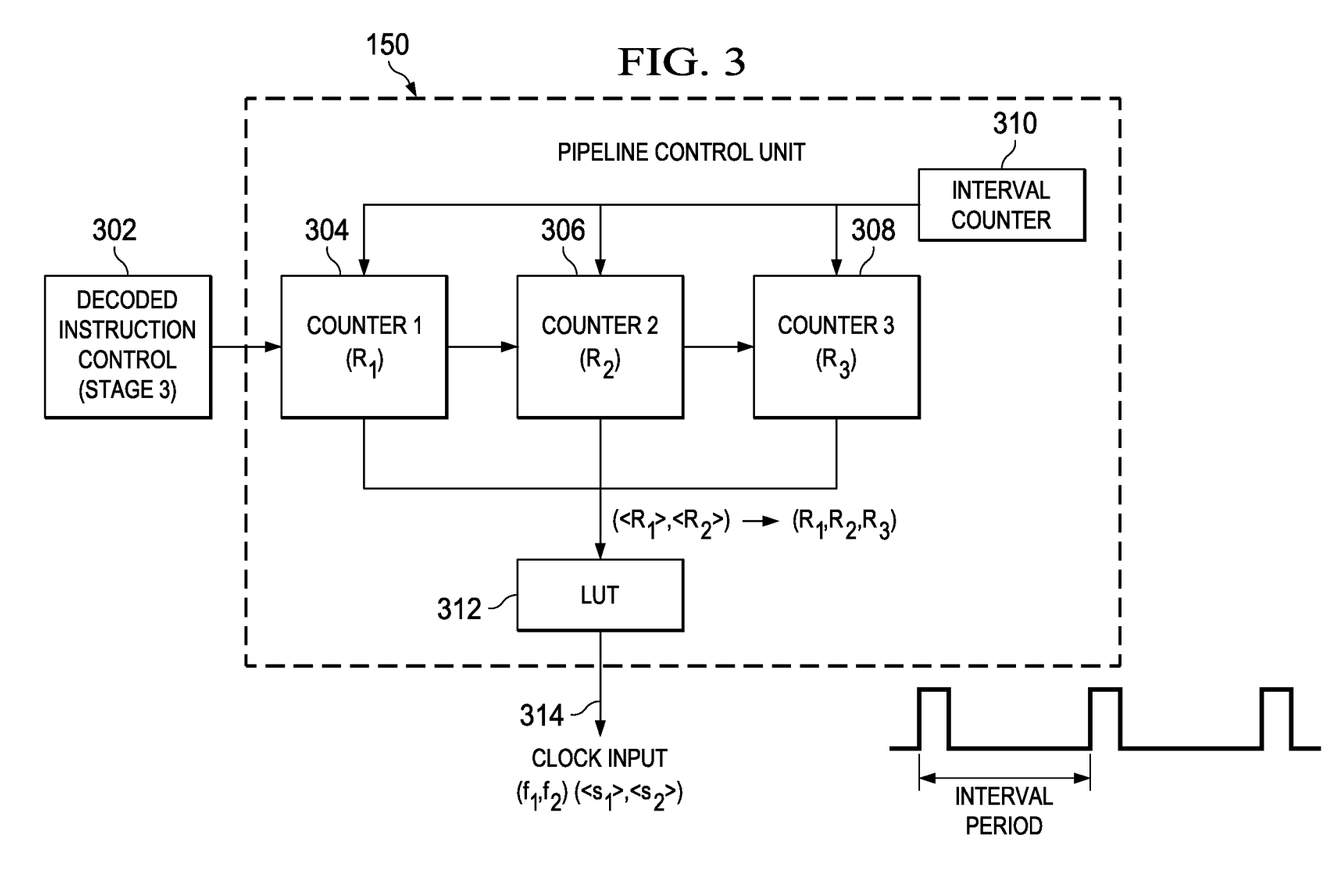
FIG. 3 is a schematic view of logic associated with a pipeline control unit configured to dynamically profile an instruction code associated with a constituent stage of the unbalanced instruction pipeline of FIG. 1.

FIG. 3 illustrates logic associated with pipeline control unit 150 configured to dynamically profile the instruction code associated with stage 3 110 of unbalanced instruction pipeline 100, according to one or more embodiments. As shown in FIG. 3 and as discussed above, decoded instruction control signals (e.g., decoded instruction control (stage 3) 302 associated with stage 3 110) is input to pipeline control unit 150 (e.g., to the aforementioned logic associated with pipeline control unit 150). Counter 1 304, counter 2 306 and counter 3 308 is associated with computing a rate vector <R> associated with a processing scenario. A pre-defined interval for profiling an instruction code associated with the processing scenario is chosen analogous to the example discussed in FIG. 2. It is assumed that there is M average number of instructions in the pre-defined interval.

A Look Up Table (LUT) 312 is implemented in the logic associated with pipeline control unit 150 to obtain the clock frequency and stall cycles (or, stall vectors) for different values of rate vector <R>. LUT 312 is implemented using a multiplexer having inputs to LUT 312 (e.g., <R>=<$R_1$>, <$R_2$>) as select lines thereof. The output of LUT 312 is the clock frequency (e.g., f=$f_1,f_2$) and/or the stall vector (e.g., <s>=<$s_1$>,<$s_2$>). At the end of every interval, the counters (e.g., counter 1 304, counter 2 306, counter 3 308) is reset through interval counter 310. Interval counter 310 is also be configured to count the pre-defined intervals (e.g., interval period in FIG. 3). Implementations of interval counters 310 are known to one skilled in the art, and, therefore, discussion associated therewith is skipped for the sake of convenience.

To summarize, in one or more embodiments, at every interval, the hardware associated with processing through unbalanced instruction pipeline 100 is updated with a new frequency and a stall vector, if applicable, based on a change in the rate vector (e.g., <$R_2$>) when compared to the previous rate vector (e.g., <$R_1$>) associated with the previous interval. Then, the counters (e.g., counter 1 304, counter 2 306, counter 3 308) associated with computing <R> (e.g., <$R_1$>, <$R_2$>) is reset to begin with the next averaging.

Figure 4:
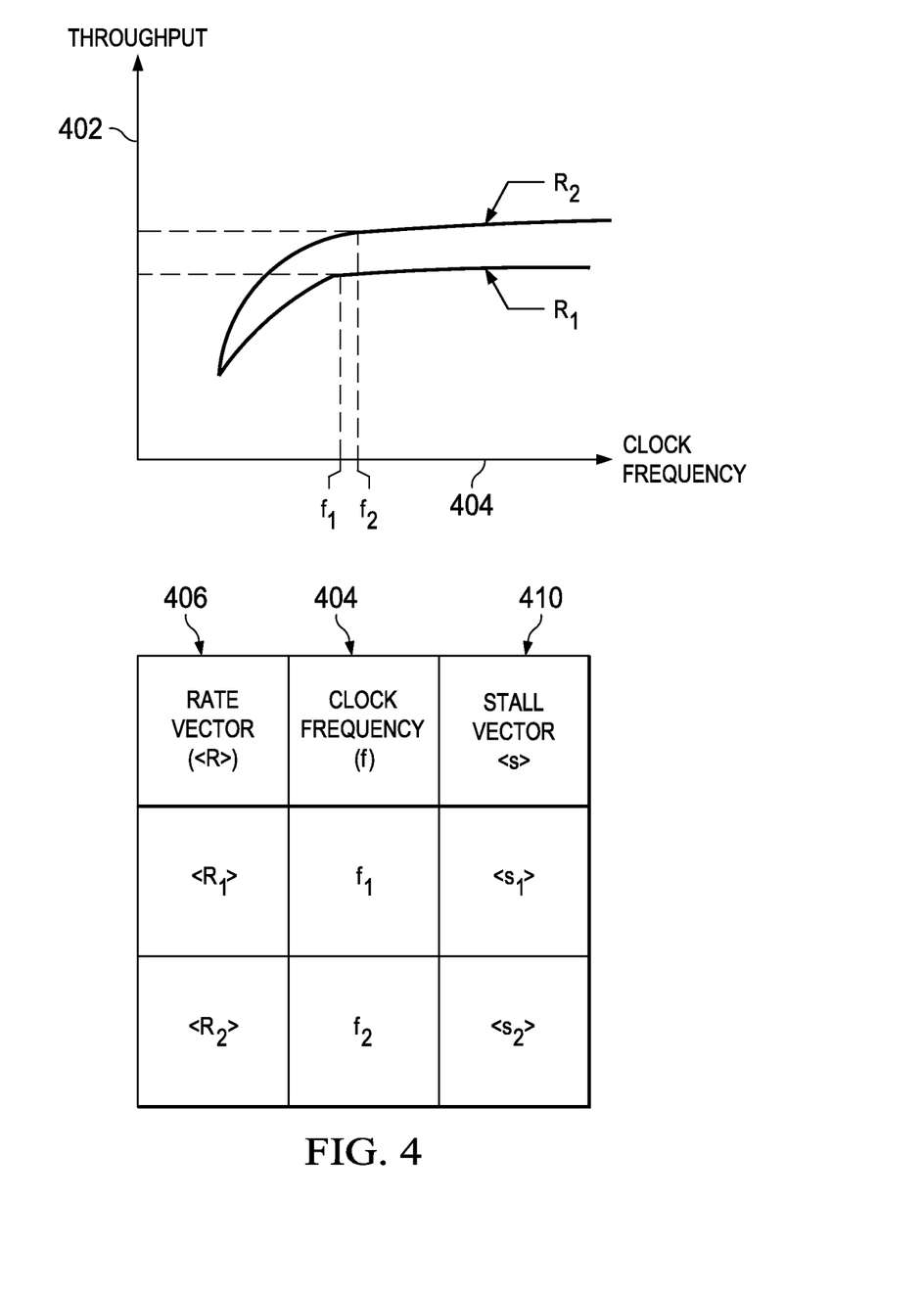
FIG. 4 is a plot of throughput associated with a constituent stage of the unbalanced instruction pipeline of FIG. 1 as a function of a clock frequency for different example values of the rate of resource occupancy associated with the constituent stage.

FIG. 4 illustrates throughput 402 associated with a stage of unbalanced instruction pipeline 100 as a function of clock frequency, f 404, for different example values of the rate vector, <R> 406, according to one or more embodiments. As discussed above, the rate vector, <R> 406 (e.g., <$R_1$>, <$R_2$>), is determined from the compiled instruction code associated therewith. In one or more embodiments, the plot is obtained through a knowledge of stall vector, <s> 410 (e.g., <$s_1$>, <$s_2$>), associated with clock frequency, f 404 (e.g., $f_1,f_2$). Increasing clock frequency, f 404, beyond a certain value (e.g., $f_1,f_2$) is not required as throughput 402 may saturate beyond a certain value. FIG. 4 also shows a table associating <R> 406, f 404, and <s> 410. Clock frequency, f 404, is configurable based on <R> 406. As seen in the discussion associated with FIG. 3, the output of LUT 312 may yield clock frequency, f 404. As a phase-locked loop (PLL) is used for generation of clock frequency, f 404, the PLL is programmed to select an appropriate frequency. The PLL is associated with a clock generation circuit (e.g., CLK GEN 3 136, CLK GEN 2 134, CLK GEN 1 132, CLK GEN 0 130) of a stage of unbalanced instruction circuit 100.

Figure 5:
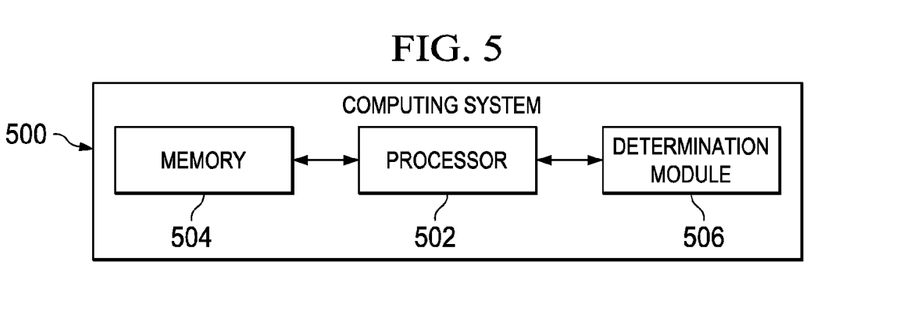
FIG. 5 is a schematic view of a computing system including a processor in which the unbalanced instruction pipeline of FIG. 1 is implemented.

FIG. 5 illustrates a computing system 500 including processor 502 in which unbalanced instruction pipeline 100 is implemented, according to one or more embodiments. Computing system 500 is a personal computer, a laptop, a notebook computer and/or a system utilizing the benefits associated with optimized unbalanced instruction pipeline 100. Computing system 500 also includes a microcontroller with a processor 502. Computing system 500 includes a memory 504 (e.g., program memory 102) configured to store the instruction code associated with processing through unbalanced instruction pipeline 100. Computing system 500 also includes a determination module 506 configured to determine the rate of resource occupancy of a constituent stage of unbalanced instruction pipeline 100 through profiling the instruction code associated with processing through unbalanced instruction pipeline 100. Processor 502 is configured to perform processing associated with unbalanced instruction pipeline 100 at a clock frequency based on an optimum a power consumption and/or a throughput associated with unbalanced instruction pipeline 100 for the determined rate of resource occupancy of the constituent stage.

Figure 6:
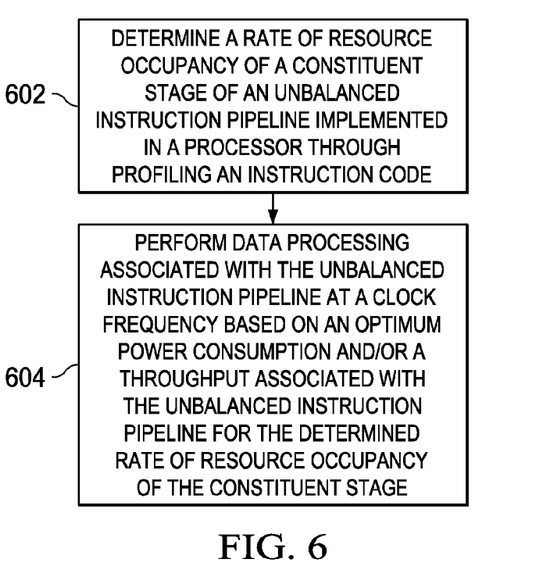
FIG. 6 is a process flow diagram detailing the operations involved in a method of performing optimum data processing through the unbalanced instruction pipeline of FIG. 1, according to one or more embodiments.

FIG. 6 illustrates a process flow diagram detailing the operations involved in a method of performing optimum data processing through unbalanced instruction pipeline 100, according to one or more embodiments. Operation 602 involves determining a rate of resource occupancy of a constituent stage of unbalanced instruction pipeline 100 implemented in processor 502 through profiling an instruction code associated therewith. Operation 604 then involves performing data processing associated with unbalanced instruction pipeline 100 at a maximum throughput at an optimum clock frequency based on the resource occupancy.

Figure 7:
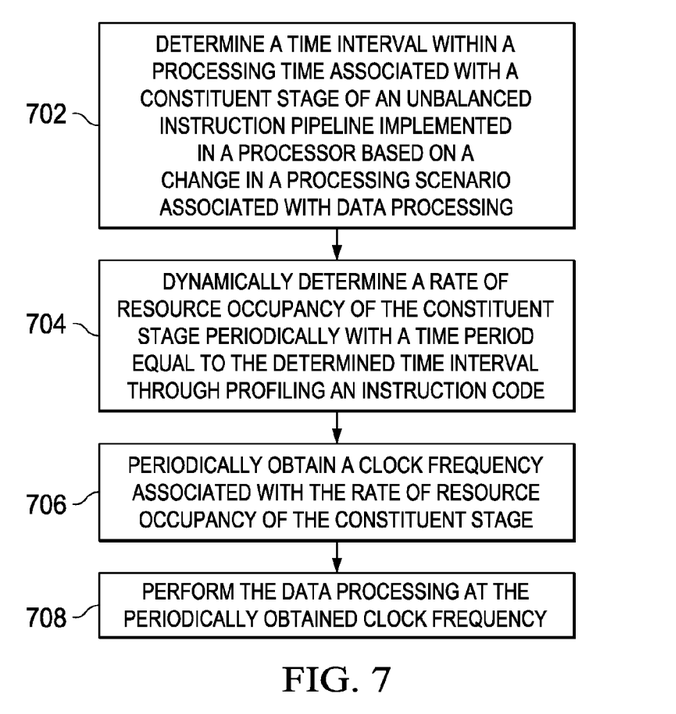
FIG. 7 is a process flow diagram detailing the operations involved in a method of performing optimum and dynamic data processing through the unbalanced instruction pipeline of FIG. 1, according to one or more embodiments.

FIG. 7 illustrates a process flow diagram detailing the operations involved in a method of performing optimum and dynamic data processing through unbalanced instruction pipeline 100, according to one or more embodiments. Operation 702 involves determining a time interval within a processing time associated with a constituent stage of unbalanced instruction pipeline 100 implemented in processor 502 based on a change in a processing scenario associated with data processing. Operation 704 involves dynamically determining a rate of resource occupancy of the constituent stage periodically with a time period equal to the determined time interval through profiling an instruction code associated therewith. Operation 706 involves periodically obtaining a clock frequency associated with the rate of resource occupancy of the constituent stage. The clock frequency corresponds to optimized power consumption and/or a throughput associated with unbalanced instruction pipeline 100. Operation 708 then involves performing the data processing at the periodically obtained clock frequency.

Exemplary embodiments discussed above can be used in high-performance, low power computing applications. Specifically, the exemplary embodiments is used in delay-locked loops (DLLs) associated with Global Positioning System (GPS) receivers and embedded/Digital System Processing (DSP) applications requiring large-scale processing. Other applications utilizing the concepts discussed herein are within the scope of the exemplary embodiments. Stage 3 110 of unbalanced instruction pipeline 100 may involve a hard macro (e.g., the data memory discussed above) therein. The divider logic, adder logic, and multiplier logic discussed above are merely for purposes of illustration. Modifications in the constituent elements of stages (e.g., increasing/decreasing the number of constituent elements, varying the constituent elements) of unbalanced instruction pipeline 100 are well within the scope of the exemplary embodiments. In one or more embodiments, it is possible that a constituent stage (e.g., stage 3 110) of unbalanced instruction pipeline 100 may include a single element, which may contribute to the maximum delay associated with unbalanced instruction pipeline 100. Optimization, as discussed above, may then be done based on the aforementioned single element.

Although the present embodiments have been described with reference to specific example embodiments, it will be evident that various modifications and changes is made to these embodiments without departing from the broader spirit and scope of the various embodiments. For example, the various systems, devices, apparatuses, and circuits, etc. described herein is enabled and operated using hardware circuitry, firmware, software or any combination of hardware, firmware, or software embodied in a machine readable medium. The various electrical structures and methods is embodied using transistors, logic gates, application specific integrated (ASIC) circuitry or Digital Signal Processor (DSP) circuitry.

In addition, it will be appreciated that the various operations, processes, and methods disclosed herein is embodied in a machine-readable medium or a machine accessible medium compatible with a data processing system, and is performed in any order. Accordingly, the specification and drawings are to be regarded in an illustrative rather than a restrictive sense.

What is claimed is:

1. A processor having an unbalanced instruction pipeline comprising:
    A; first execution logic circuitry in the pipeline having a first clock signal input and a first stall cycle input, and having a first task completion time for each execution of the first execution logic circuitry;
    B; second execution logic circuitry in the pipeline having a second clock signal input and a second stall cycle input, and having a second task completion time for each execution of the second execution logic circuitry;
    C; first counter circuitry coupled to the first execution logic circuitry and producing a first count of each execution of the first execution logic circuitry;
    D; second counter circuitry coupled to the second execution logic circuitry and producing a second count of each execution of the second execution logic circuitry; and
    E; lookup table circuitry having inputs coupled to the first and second counter circuitry and having outputs coupled to the first and second clock signal inputs and the first and second stall cycle inputs, the lookup table circuitry causing clock signals of different frequencies and different numbers of stall cycles to be applied to the first and second execution logic circuitry in response to the first and second counts in the first and second counter circuitry.

2. The processor of claim 1 in which the first and second counter circuitry each have a reset input receiving a reset signal to reset the count of the counter circuitry to zero, and the processor including interval counter circuitry having a reset output connected to the reset inputs.

3. The processor of claim 1 including third execution logic circuitry in the pipeline having a third clock signal input and a third stall cycle input, the third execution logic circuitry having a third task completion time for each execution of the third execution logic circuitry, the processor including third counter circuitry coupled to the third execution logic circuitry and producing a third count of each execution of the third execution logic circuitry, the lookup table circuitry having inputs coupled to the third counter circuitry and having outputs coupled to the third clock signal input and the third stall cycle input, the lookup table circuitry causing clock signals of different frequencies and different numbers of stall cycles to be applied to the first, second, and third execution logic circuitry in response to the first, second, and third counts in the first, second, and third counter circuitry.

4. A process of operating a processor having an unbalanced instruction pipeline comprising:
    A; executing an operation in first execution logic circuitry having a first task completion time at a first clock frequency and a first number of stall cycles for each execution of the first execution logic circuitry;
    B; executing another operation in second execution logic circuitry having a second task completion time at a second clock frequency and a second number of stall cycles for each execution of the second execution logic circuitry;
    C; counting each execution of the first execution logic circuitry in first counter circuitry coupled to the first execution logic circuitry to produce a first count;
    D; counting each execution of the second execution logic circuitry in second counter circuitry coupled to the second execution logic circuitry to produce a second count; and
    E; causing clock signals of different frequencies and different numbers of stall cycles to be applied to the first and second execution logic circuitry in response to the first and second counts in the first and second counter circuitry.

5. The process of claim 4 in which the causing includes causing the clock signals of different frequencies and different numbers of stall cycles to be applied to the first and second execution logic circuitry through lookup table circuitry, which has inputs coupled to the first and second counts in the first and second counter circuitry and which has outputs coupled to clock signal inputs and stall cycle inputs of the first and second execution logic circuitry.

6. The process of claim 4 including executing a third operation in third execution logic circuitry at a third task completion time for each execution of the third execution logic circuitry, counting each execution of the third execution logic circuitry to produce a third count in third counter circuitry having an input coupled to the third execution logic circuitry, and causing clock signals of different frequencies and different numbers of stall cycles to be applied to the first, second, and third execution logic circuitry in response to the first, second, and third counts in the first, second, and third counter circuitry.

7. The process of claim 4 including resetting the counts of the executions in the first and second execution circuitry to zero at a fixed interval.

\* \* \* \* \*